Patented June 2, 1936

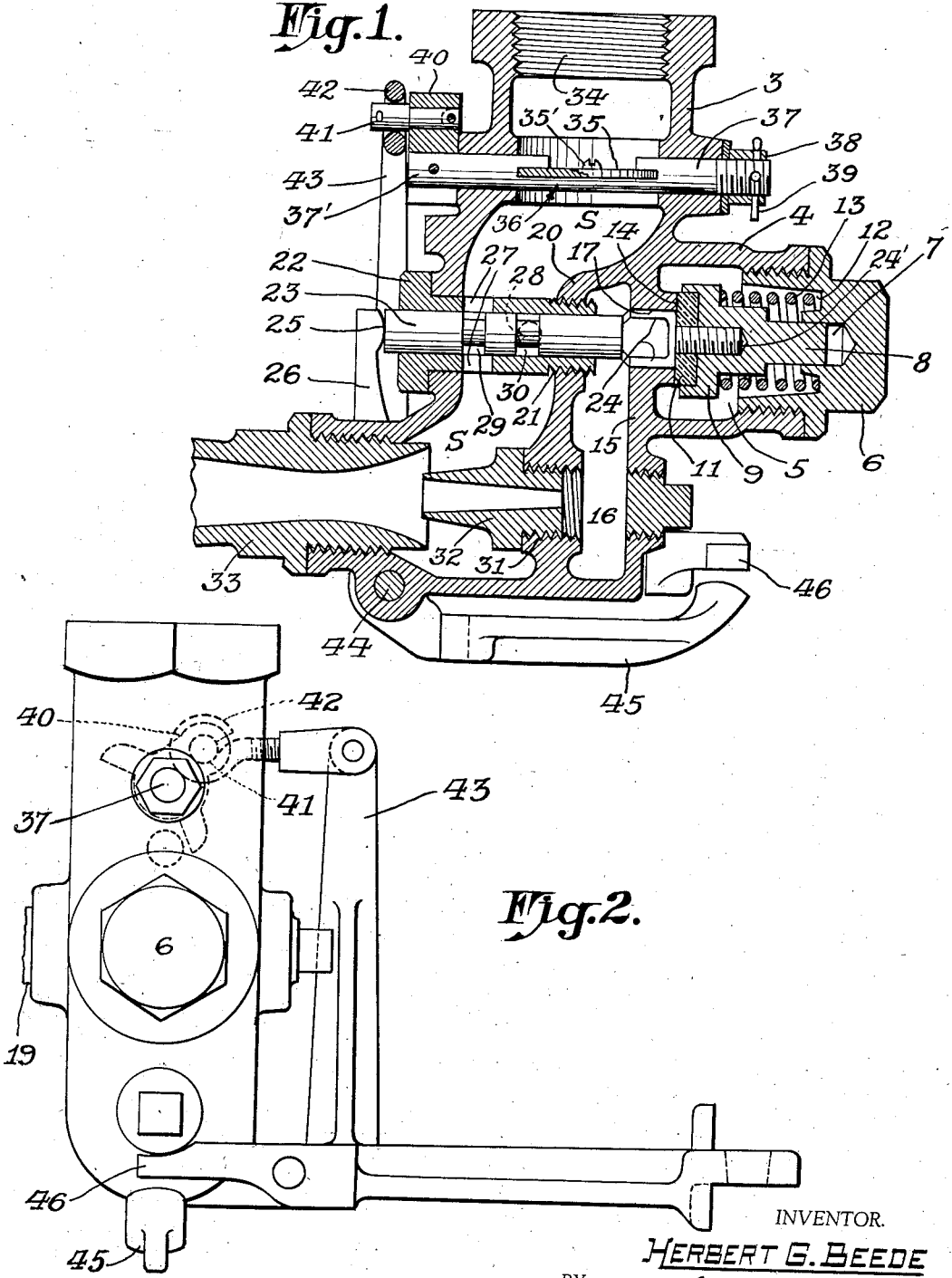

2,043,027

UNITED STATES PATENT OFFICE 2,043,027

VALVE

Herbert G. Beede, Pawtucket, R. I.

Application January 19, 1935, Serial No. 2,593

5 Claims. (Cl. 230—95)

My present invention relates to valves, adapted for use in connection with garment steaming and pressing machines, or other devices where a valve functioning with an ejector action, as hereinafter explained, might be useful for withdrawing steam and moisture from articles.

The valve embodying my present invention resembles generally the valve shown and described in my prior Patent 1,842,500, but embodies certain improvements thereover, said improvements residing in effectively preventing the escape of fluid from the valve and increasing the suction, and preventing escape of the steam used for steaming garments on the pressing elements.

The foregoing and other objects and advantages of the invention will become more apparent and will be pointed out during the course of the following description of the accompanying drawing, in which Fig. 1 is a vertical central sectional view through a valve embodying my present invention; and Fig. 2 is a side elevation of the same valve.

Referring to the drawing, the numeral 3 designates the casing or shell of the valve, which is provided with a lateral tubular extension 4 providing a pressure chamber 5 closed at its outer end by a plug 6 threaded into the tubular extension. The plug 6 is provided on its interior with a socket 7 which slidably receives the reduced end 8 of a valve 9, having secured to its outer end a washer 11. Around the socket 7 on the plug is formed an annular channel or groove 12, in which is seated one end of a coil spring 13, the other end of which abuts the enlarged end of the valve 9 normally urging the washer 11 into snug engagement with the valve seat 14 formed on the wall 15 of the casing 3, which separates the chamber 5 from a second chamber 16. An opening 17 is provided in the wall 15 between the chambers 5 and 16 and the seat 14 is formed at one end of said opening.

The chamber 5 is provided with an opening 19 for connection with a conduit leading from a suitable source of fluid under pressure. Obviously, the valve 9 normally closes the port 17 under the action of the spring 13, and prevents the fluid under pressure from flowing from chamber 5 to chamber 16 except when desired, as presently explained.

The casing 3 is provided on its interior with a wall 20 having a screw threaded opening 21 alined with the longitudinal axis of the valve 9 and receiving the inner end of a packless gland 22 in which is slidably mounted a stem 23. The enlarged end 24 of screw 24', which connects washer 11 to valve 9, is disposed in the port 17, and is preferably slabbed in cross section to permit passage of steam from chamber 5 to chamber 16 when desired. The inner end of stem 23 abuts head 24, and the outer end of the stem 23 projects beyond the head of the gland 22 and is alined with the upper curved end 25 of an operating lever 26.

The gland 22 is shown provided with two sets of openings 27 and 28, the latter being shown in dotted lines in Fig. 1 arranged at intervals on the gland between the openings 27. The stem 23 is provided with two circumferential grooves designated by the numerals 29 and 30. The grooves 29 and 30 are located equal distances from the ends of the stem, and are so spaced with respect to each other, and relative to the openings 27 and 28, as to assure proper relative positioning of the openings and grooves when the valve is assembled or repaired, and during operation thereof.

The wall 20 is provided adjacent its bottom with a screw threaded opening 31 which receives the inner end of a nozzle 32, communicating with the chamber 16. The nozzle is also in communication with a discharge or outlet pipe 33 screw threaded into the lower end of the casing. The inner end of the pipe 33 preferably surrounds the outer end of the nozzle 32, or is located in proximity thereto. The pipe 33 also is in communication with the passage S.

The upper end of the passage S terminates in a threaded opening or socket 34 on the casing adapted for connection as by means of a pipe, not shown, with the steam distributing chamber or chambers of pressing elements of garment pressing machines. Also mounted in the passage S, above the gland 22, is a butterfly valve 35. A rod 36 supports the butterfly valve, and the ends of the rod form trunnions 37 and 37', extending through and journaled in alined openings in the casing 3. The outer end of trunnion 37 is provided with a lock nut 38 through which and trunnion 37 extends a cotter pin 39. The trunnion 37' is connected at its outer end to a crank 40, the upper end of which is provided with a lug 41 received in the eye 42 of a link attached to lever 43. The rod 36 is recessed at its center to receive the butterfly valve, and a screw 35' holds the valve 35 on rod 36.

The butterfly valve normally closes the passage S to prevent the flow or escape of steam through the passage when steaming or pressing garments. Bell crank lever 26 is pivotally connected to the casing at 44, so that when the end 45 of said lever is depressed, the end 25 will be swung in against the stem 23 moving the stem inwardly and positioning the grooves 29 and 30 in partial registry with the openings 27 and 28 of the packless stuffing box. At the same time, the stem 23 pushes the screw head 24 and moves the valve 9 against the action of the spring 13 uncovering the port 17 and establishing communication therethrough between chambers 5 and 16. This permits steam to flow with an injector action through the nozzle 32 into pipe 33, and with the butterfly valve opened creates an ejector action or suction drawing steam and moisture from the garments through the passage S and across the packless stuffing box or gland 22.

Due to the fact that the packless stuffing box is arranged in and across the passage S, the suction created in said passage when the steam is injected into the pipe 33 from nozzle 32 will also draw down or suck into passage S any steam which may tend to escape through the packless stuffing box and thus preventing leakage of steam from the valve casing. The stuffing box or gland 22 is of less width than passage S, so that only part of the suction passes through openings 27 and 28 and grooves 29 and 30.

The end 46 of lever 43 is preferably so arranged with respect to the lever 45, or is connected thereto in such manner as to effect simultaneous or collective movement of the levers, whereby the passage S will be closed when the port 17 is closed, to prevent escape of steam from the pressing elements, but is opened when the port 17 is opened, to permit steam and moisture to be drawn through the passage S from the pressing elements and garments thereon.

I claim:

1. A fluid ejecting device comprising a casing having a suction passage therethrough adapted for connection with a source from which fluid is to be withdrawn, an injector to discharge a fluid under pressure to create a suction through said passage, a valve controlling communication between said injector and a source of supply of said pressure fluid, an operating stem for said valve, a packless gland for said stem located directly within and across said suction passage between the injector and source from which the first fluid is withdrawn, and means on said stem and gland permitting pressure fluid which may enter the gland to be withdrawn and discharged into the suction passage by the action of fluid drawn through said passage when said valve is open.

2. A fluid ejecting device comprising a casing having a suction passage therethrough adapted for connection with a source from which fluid is to be withdrawn, an injector to discharge a fluid under pressure to create a suction through said passage, a valve controlling communication between said injector and a source of supply of said pressure fluid, an operating stem for said valve, a packless gland for said stem located directly within and across said suction passage between the injector and source from which the first fluid is withdrawn, said gland being provided with openings therethrough, and said stem having a groove adapted for registry with said openings when the said valve is opened to effect withdrawal from said gland any of said pressure fluid which may have leaked thereinto and to discharge the same into the suction passage by the action of fluid drawn through said passage.

3. A fluid ejecting device comprising a casing having a suction passage therethrough adapted for connection with a source from which fluid is to be withdrawn, an injector to discharge a fluid under pressure to create a suction through said passage, a valve controlling communication between said injector and a source of supply of said pressure fluid, an operating stem for said valve, a packless gland for said stem located directly within and across said suction passage between the injector and source from which the first fluid is withdrawn, said gland being provided with spaced sets of openings therethrough located in said suction passage, and said stem being provided with spaced circumferential grooves adapted for registry with said openings when the said valve is opened to withdraw from said gland any of said pressure fluid which may have leaked thereinto and to discharge the same into the suction passage by the action of fluid drawn through said passage.

4. A fluid ejecting device comprising a casing having a suction passage therethrough adapted for connection with a source from which fluid is to be withdrawn, an injector to discharge a fluid under pressure to create a suction through said passage, a valve controlling communication between said injector and a source of supply of said pressure fluid, a second valve located within said passage between said injector and the source from which fluid is to be withdrawn, manually operated means to control said first valve to establish communication between said injector and a source of fluid under pressure, and manually operated means connected to said second valve to establish communication between the outlet of said passage and the source from which the fluid is to be withdrawn.

5. A fluid ejecting device comprising a casing having a suction passage therethrough adapted for connection with a source from which fluid is to be withdrawn, an injector to discharge a fluid under pressure to create a suction through said passage, a valve controlling communication between said injector and a source of supply of said pressure fluid, a second valve normally closing said passage and located between the injector and source from which the fluid is to be withdrawn, and manually operated means for collectively operating said valves to establish communication between said injector and a source of fluid under pressure and between said source from which the fluid is to be withdrawn and the outlet of said passage into which the injector discharges.

HERBERT G. BEEDE.